June 23, 1959     I. S. BLUMENTHAL ET AL     2,891,725

RESET INTEGRATOR

Filed Dec. 7, 1953     4 Sheets-Sheet 1

INVENTORS:
Irwin S. Blumenthal
Ross M. Chiles
Chester W. Larsen, Jr.
Kenneth M. Stevenson, Jr.

By Hubert E. Metcalf
Their Patent Attorney

June 23, 1959　　　I. S. BLUMENTHAL ET AL　　　2,891,725
RESET INTEGRATOR

Filed Dec. 7, 1953　　　　　　　　　　　　　　4 Sheets-Sheet 3

INVENTORS:
Irwin S. Blumenthal
Ross M. Chiles
Chester W. Larsen, Jr.
Kenneth M. Stevenson, Jr.

By Herbert E. Metcalf
Their Patent Attorney

June 23, 1959  I. S. BLUMENTHAL ET AL  2,891,725
RESET INTEGRATOR

Filed Dec. 7, 1953  4 Sheets-Sheet 4

INVENTORS:
Irwin S. Blumenthal
Ross M. Chiles
Chester W. Larsen, Jr.
Kenneth M. Stevenson, Jr.

By Herbert E. Metcalf
Their Patent Attorney

United States Patent Office 2,891,725
Patented June 23, 1959

2,891,725

RESET INTEGRATOR

Irwin S. Blumenthal, Manhattan Beach, Ross M. Chiles and Chester W. Larsen, Jr., Inglewood, and Kenneth M. Stevenson, Jr., Palos Verdes, Calif., assignors to Northrop Corporation, Hawthorne, Calif., a corporation of California Application December 7, 1953, Serial No. 396,532

14 Claims. (Cl. 235—183)

The present invention relates generally to integrators and more particularly to an electromechanical reset integrator of the analogue category.

An electromechanical integrator is an integrating device wherein the input signal applied thereto is an electrical signal, for example, a D.C. voltage proportional to the time rate of change of a variable. The output of such an integrator is a mechanical output which can be angular rotation of an output shaft, the angular displacement of which is proportional to the variable. Thus, an input function represented by an electrical input signal can be integrated by an electromechanical integrator to provide a mechanical output which is proportional to the integral of the input function.

At present, the standard type of electromechanical integrator used in general practice is the well known velocity servo system comprising an electrical motor having a tachometer feedback element mechanically coupled to the motor output shaft, the angular displacement of this output shaft being proportional to a variable and the fed back tachometer output voltage being proportional to the time rate of change of this variable. The motor is controlled through an amplifier according to an electrical input signal provided thereto which is the algebraic sum of an input signal proportional to the time rate of change of the variable and the tachometer feedback signal. These two signals are combined by an electrical differential, e.g., by an electronic mixer or adder circuit. Since the input signal is proportional to the time rate of change of the variable and the output shaft rotation of the motor is proportional to the variable itself, the velocity servo network constitutes an electromechanical integrator.

The now realizable accuracies of the velocity servo systems using commercially available components are of the order of approximately 1 or 2%. An electronic D.C. analogue type integrator is more accurate, the output being within .1% error. However, the electronic analogue integrators have an electrical output and, moreover, are limited to reasonably short computing times if the resultant output signal is to remain within a given percent error of the true integral. Initial errors can also increase with time in the integration process.

It is an object of this invention to provide an electromechanical integrator which remains highly accurate for long computing times.

It is another object of the invention to provide electromechanical integrating means wherein a conventional D.C. amplifier and its inherent accuracy can be utilized.

Another object of the invention is to provide a resetting electromechanical integrator wherein saturation of the D.C. amplifier is avoided.

A further object of this invention is to provide an electromechanical integrator having a positive and negative mechanical output respectively for a positive and negative electrical input thereto.

A still further object of the invention is the provision of means for an electromechanical integrator wherein an incremental step output is secured.

Another object of the invention is to provide an electromechanical integrator that has low errors due to drift.

The foregoing and other objects are preferably accomplished, in short, by providing an integrating operational amplifier comprising a conventional balanced or chopper stabilized type of D.C. amplifier having a high quality (low leakage) capacitance for a feedback network connecting the output and input of the D.C. amplifier together. The input signal to this operational amplifier is an electrical signal, the magnitude of which is proportional to the time rate of change of a variable. The output of the operational amplifier is also an electrical signal which is used to control an amplitude discriminator, for example, a balanced, polarized relay. This relay operates at a nominal output level of the operational amplifier and releases at a predetermined low output signal level. Operation of this amplitude discriminator (relay) control means provides a signal of an opposing polarity that is applied back to the input of the operational amplifier, thus driving the output signal thereof down to a level whereby the polarized relay releases and the cycle is repeatedly performed until the input signal is removed. This reset frequency is high compared to input signal frequency and duration. At the same time that the polarized relay is actuated, means for producing a mechanical output is also energized to provide, for example, an angular shaft rotation of a certain amount (a discrete increment) in one direction. For an input signal of an opposite polarity, the polarized relay is actuated in another direction, this action again controlling the means that provides a signal of opposing polarity which is applied to the input of the operational amplifier, driving the output signal down, as before. The polarized relay in this case also causes the actuation of the means which produce a mechanical output, an angular shaft rotation of a given amount, for example, in a reversed direction to that of before.

This invention possesses numerous other objects and features, some of which, together with the foregoing, will set forth in the following description of a preferred embodiment of the invention and the invention will be more fully understood by reference to the accompanying drawings in which.

Figure 1:
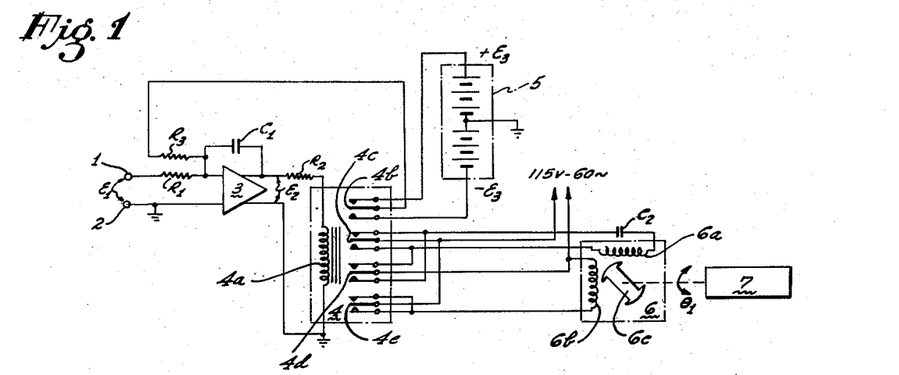
Figure 1 is a schematic diagram of one version of the reset integrator.

Referring first to Figure 1, there is shown a schematic diagram of a preferred embodiment of the present invention. A voltage $E_1$, proportional to the rate of change of a variable, can be applied across input terminals 1 and 2. These terminals are connected to the input of a conventional D.C. amplifier 3 through a series resistance $R_1$ as shown. Terminal 2 can also be connected to ground. A feedback network consisting of capacitance $C_1$, in this instance, couples the output and input of D.C. amplifier 3 together, to provide an integrating operational amplifier wherein capacitance $C_1$ is the integrating element. Resistance $R_2$ in series with coil 4a of a balanced polarized relay 4 are both connected across the output of the operational amplifier having an output voltage $E_2$. Added resistance $R_2$ shortens the time constant of this circuit. Polarized relay 4 can have four poles 4b, 4c, 4d and 4e, each associated with a pair of two position contacts. The poles are each respectively balanced between a pair of contacts such that the poles make contact in one position (direction) for an energizing output voltage $E_2$ of one polarity and make contact in the other position for an output voltage $E_2$ of the opposite polarity. As shown in Figure 1, the poles of relay 4 are actuated to make contact with the upper relay contacts when a negative (with respect to ground) input voltage $E_1$ is applied across terminals 1 and 2. The poles are actuated to make contact with the lower relay contacts when a positive input voltage $E_1$ is applied across terminals 1 and 2. Output voltage $E_2$ has a 180 degree phase difference with respect to input voltage $E_1$ as is usual with an ordinary D.C. amplifier.

A positive and negative voltage source 5 having a stable voltage output is connected to the two position contacts of pole 4b as shown in Figure 1. A positive voltage is connected to the upper contact of pole 4b and a negative voltage is connected to the lower contact. Pole 4b is connected back to the input of D.C. amplifier 3 through a resistance $R_3$ (for a summing integrator). The other poles are connected to control the flow of power to a synchronous motor 6. The motor 6 can be a two phase synchronous motor as shown in Figure 1. A phase shifting capacitance $C_2$ is connected in series with winding 6a, this combination being connected across the two contacts of pole 4c. Pole 4c is connected to the same line of A.C. power (for example, 115 volts at 60 cycles) as is pole 4e. The other line of A.C. power is connected directly to one end of winding 6b and to pole 4d. The other end of winding 6b can be connected to both contacts of pole 4e. The upper contact of pole 4c is connected to the lower contact of pole 4d and the lower contact of pole 4c is connected to the upper contact of pole 4d. In this way, A.C. power is provided in one direction to winding 6a when the poles of polarized relay 4 are actuated to one position (upwards, for example) and in a reversed direction (180 degrees phase change) when the poles are deflected to the other position (downwards, in Figure 1). A.C. power to winding 6b is provided in the same direction irrespective of the position of the poles of relay 4 are actuated. The direction of rotation of rotor 6c is hence dependent upon the position in which the poles of relay 4 are deflected. The output of motor 6 is in rotation of output shaft, the amount of rotation $\theta_1$ being a measure of the integral of the input to the integrator. Thus, when an input voltage $E_1$ proportional to the rate of change of a variable is applied to the input of the reset integrator, an angular output $\theta_1$ (mechanical shaft rotation) is derived which is proportional to the variable itself. An ordinary mechanical counter 7 can be connected to the output of motor 6 to record the amount of angular output shaft rotation.

The operation of the reset integrator illustrated in Figure 1 can be described by examining the response of the circuit to a (low noise) step function input of voltage applied at terminals 1 and 2. The results thus obtained are valid for other types of input signals since any other signal can be substantially reproduced by the suitable combination of a series of positive and negative step functions, properly displaced. The response to each step function can then be combined by reason of a linear superposition property of the circuit. The forward gain $A$ of D.C. amplifier 3 is large, such that the output voltage $E_2$ of the integrator, for reasonable computing times, can be approximated by the integral of the input voltage function multiplied by a constant, this constant being $-1/R_1C_1$ when relay 4 is not energized and capacitance $C_1$ leakage is negligible. When relay 4 is actuated, however, the output voltage $E_2$ is modified by the application of voltage $E_3$ from source 5 which is provided in a polarity opposing that of the applied input voltage $E_1$. This action, of course, is accomplished through use of the polarized relay 4. In this instance, the output voltage $E_2$ is the net result of the integrals of two counteracting input voltages, the original input voltage $E_1$ (applied step function $E_6$, for example) and the opposing feedback voltage $E_3$ of source 5 which can also be a step function of voltage. Since this latter voltage is applied through resistance $R_3$, the output voltage $E_2$ can now be approximated by the algebraic sum of the former integral times the constant $-1/R_1C_1$ plus the integral due to the feedback voltage multiplied by a constant $-1/R_3C_1$. This latter quantity opposes te former and can drive the output voltage $E_2$ down. The range of operation is such as not to saturate the amplifier and the capacitance $C_1$.

The forward gain $A$ of D.C. amplifier 3 can, for example, be 10,000 and the output voltage $E_2$ can have a range of $\pm 100$ volts, the usual machine unit. This output voltage is applied across the series combination of resistance $R_2$ and the coil 4a of relay 4, resistance $R_2$ having a resistance of 20,000 ohms, for example, and coil 4a can be a 25,000 ohm resistance coil. The relay coil 4a requires a nominal voltage $E_4$ of approximately 51 volts to operate; the relay releasing at $E_5$ of approximately 9 volts, for example. Other values are, for example, resistances $R_1$ and $R_3$ of 2 megohms each, capacitance $C_1$ of 1.157 mfd. and capacitance $C_2$ having a capacity of .68 mfd. Precision type resistances are generally used to minimize drift errors from this source. The motor 6 can be operated satisfactorily at 100 r.p.m. and the feedback voltage of source 5 is normally chosen equal in magnitude to the maximum value of input voltage $E_1$.

Figure 2:
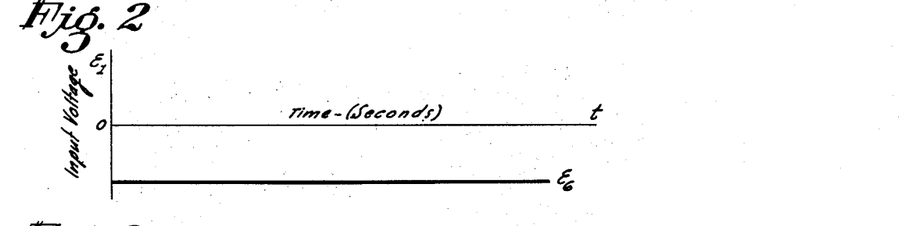
Figures 2, 3 and 4 are graphs which illustrate the operation of the reset integrator version of Figure 1.
Figure 3:
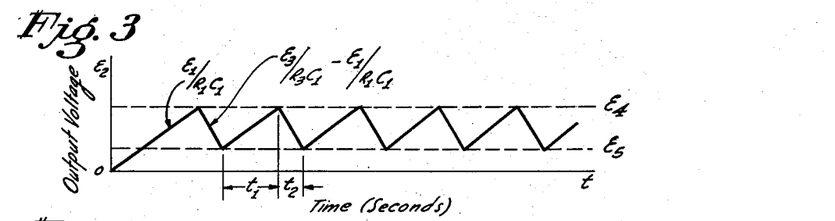
Figure 4:
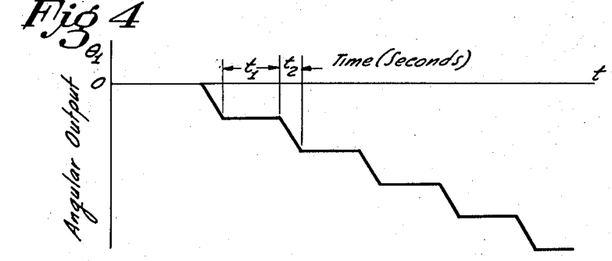

The operation of the circuit of Figure 1 can be more fully understood by reference to the graphs of Figures 2, 3 and 4. In Figure 2, the input voltage $E_1$ is plotted as a function of time $t$ as the independent variable. When a negative step function of voltage $E_6$ is applied at the input of the reset integrator through resistance $R_1$, the output voltage $E_2$ (Figure 3) rises at a rate $E_1/R_1C_1$ ($E_1=E_6$) until $E_2$ reaches the voltage $E_4$ at which time relay 4 is actuated. An opposing voltage $E_3$ is fed back to the input of the integrator through resistance $R_3$ causing the output voltage $E_2$ to fall at a rate $E_3/R_3C_1 - E_1/R_1C_1$ until $E_2$ reaches the release voltage $E_5$ whereupon relay 4 operates again, this time disconnecting the opposing voltage $E_3$ from being fed back into the input of the integrator and the output voltage $E_2$ rises again at the former rate of $E_1/R_1C_1$. The relay 4 is actuated again when $E_2$ reaches the voltage $E_4$, $E_2$ again dropping until the release voltage $E_5$ is reached. The cycle is repeated thereafter as shown in Figure 3.

The actuation of relay 4 in providing the opposing voltage $E_3$ back to the input of the integrator also connects A.C. power to motor 6. The rotor 6c is accordingly rotated, providing a mechanical output $\theta_1$ at the output shaft. The angular rotation can be recorded by counter 7. Motor 6 is energized for a time $t_2$ each cycle, the output $\theta_1$ increasing in steps as shown in Figure 4. The output voltage $E_2$ is increasing during time $t_1$ when the angular output $\theta_1$ remains constant. Thus, the reset integrator can operate for long periods of time and still avoid saturation errors, this being accomplished by a repetitive, incremental summing of mechanical output while holding the output voltage $E_2$ within permissible limits over each cycle of operation. Errors due to D.C. amplifier drift make up the most important computing discrepancies detected in actual use. This drift includes the effect of input voltage drift, changes in resistance values and vacuum tube characteristics and, in particular, power supply changes, the latter including feedback voltage drift in the reset integrator. There is also the effect caused by transients each time the relay 4 is actuated to feed back the opposing voltage $E_3$ to the input of the reset integrator. For low input voltages the motor 6 is energized for a shorter length of time each cycle; the transient condition becoming more pronounced.

There is another source of error with the reset integrator at the output end, i.e., the mechanical actuator employed to produce the mechanical output. The curve shown in Figure 4 is for a motor which would start and stop instantaneously. Actually, however, the motor cannot reach synchronous speed instantaneously, so the angular output lags the correct output by a small error. The same error occurs each cycle such that the percentage error is constant, except for low input voltages when the motor is turned on and off before the motor can reach synchronous speed. In this case, the error does not remain constant because the actual output rate cannot equal the correct output rate in an operation cycle and the error increases rapidly. Thus, an optimum realizable actuator (motor) is one which reaches synchronous speed in a short time (compared to the motor energized time interval) and the number of turns lost in starting is equal to the number of turns gained in stopping each cycle thereby nullifying this type of error.

Figure 5:
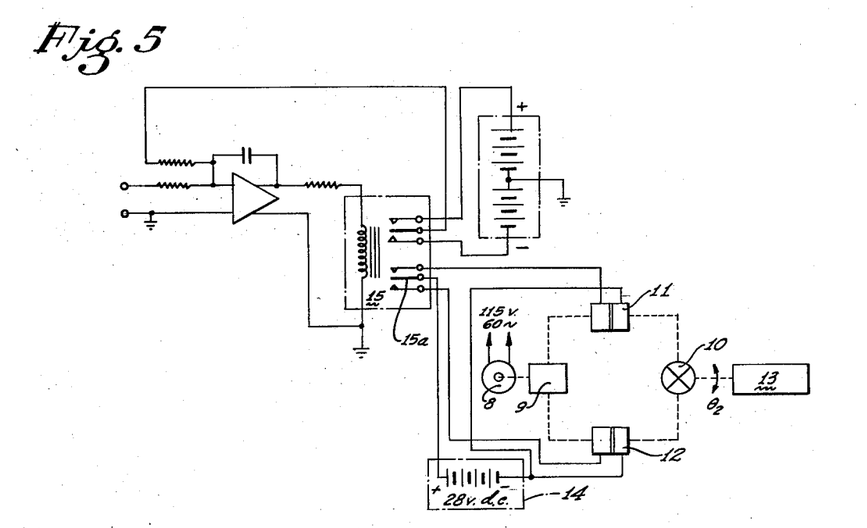
Figure 5 is a schematic diagram of another version of the reset integrator, this version differing from that of Figure 1 particularly in the output means.

A magnetic clutch can be used for engaging and disengaging the mechanical output shaft with a continuously running synchronous motor. This configuration is shown in Figure 5. A synchronous motor 8 drives gearing 9 which has two outputs rotating in opposite directions. These outputs are coupled to two inputs of a differential 10 through magnetic clutches 11 and 12, respectively. The output of the differential 10 yields a mechanical output $\theta_2$ in the form of output shaft rotation. This output can be suitably recorded by coupling a counter 13 to the differential output shaft. The magnetic clutches 11 and 12 can be energized by means of a power supply 14 providing 28 volts D.C. to either clutch 11 or 12 according to the direction of actuation of a double pole polarized relay 15 (which functions identically as relay 4 does in Figure 1). When pole 15a makes contact with the upper position contact, power supply 14 is connected to energize magnetic clutch 11. Magnetic clutch 12 is energized when the pole 15a makes contact with the lower position contact. In this way, the mechanical output $\theta_2$ can be rotated in one direction or the other through differential 10. Other components shown in Figure 5 are identical to corresponding elements in Figure 1 and have not been labeled in this figure.

Figure 6:
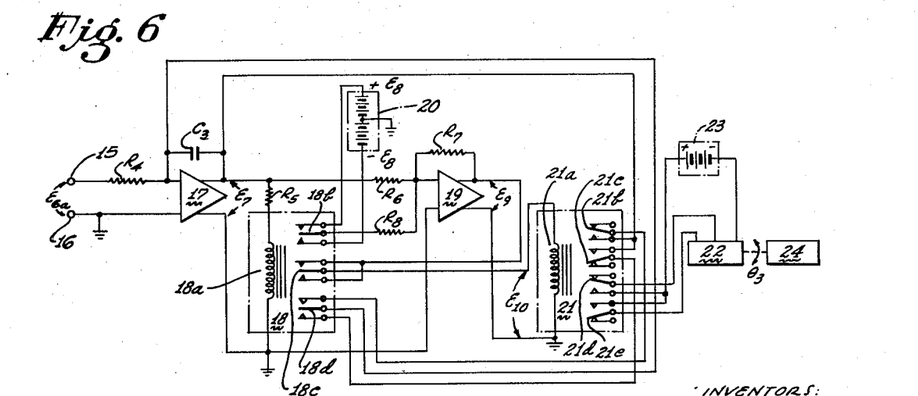
Figure 6 is a schematic diagram of a reset integrator of the version wherein the integrating capacitance is periodically shorted.

Another version of the reset integrator is shown in Figure 6. In this form of reset integrator, the feedback capacitance is shorted out whenever the output voltage of the integrator reaches a specified value, ±100 volts, for example. At the same time that the information stored in the capacitance is being discarded (by shorting), a mechanical output is put into an output shaft to provide an angular rotation output, for example. Referring now to Figure 6, a voltage $E_{6a}$, which can be proportional to the rate of change of a variable, is applied across input terminals 15 and 16. These terminals are connected to the input of a conventional D.C. amplifier 17 through a series resistance $R_4$ as shown. Terminal 16 can also be connected to ground. A capacitance $C_3$ is the feedback element connecting the output and input of D.C. amplifier 17 providing an integrating operational amplifier in which capacitance $C_3$ is the integrating (storage) means. A resistance $R_5$ is connected in series with coil 18a of a balanced, polarized relay 18. The resistance $R_5$ and series coil 18a are connected across the output of the operational amplifier having an output voltage $E_7$. The resistance $R_5$ was included to shorten the time constant of the series circuit of resistance $R_5$ and coil 18a.

The output of the integrator (integrating operational amplifier) is connected to the input of a summing operational amplifier through series input resistance $R_6$. The summing amplifier comprises a conventional D.C. amplifier 19 having a resistance $R_7$ feedback element. Resistance $R_8$ is another input resistance to the summing amplifier. The polarized relay 18 has three poles, 18b, 18c and 18d, each associated with a pair of contacts. The upper contact of pole 18b is connected to a positive, stable voltage $E_8$ from a source 20 and the lower contact of pole 18b is connected to a negative stable voltage $E_8$ from the source 20. Pole 18b is connected to input resistance $R_8$ as shown. The output of the summing amplifier is connected in series with coil 21a of a polarized relay 21 through either contact of pole 18c. The last pole 18d is connected to the input side of capacitance $C_3$ and the upper contact of pole 18d is connected to pole 21b of relay 21. The lower contact of pole 18d is connected to pole 21c of relay 21. The normally open contacts of poles 21b and 21c are tied together and connected to the output side of capacitance $C_3$.

An output voltage $E_9$ is obtained proportional to the algebraic sum of the input voltages to the summing amplifier. The integrator output voltage $E_7$ is applied to the input of the summing amplifier through resistance $R_6$ and the stable voltage $E_8$ is also applied to the same input of the summing amplifier through resistance $R_8$. The direction pole 18b is actuated determines whether a positive or negative $E_8$ voltage is provided through resistance $R_8$. The connections are such that the opposite polarity is secured for stable voltage $E_8$, as compared with integrator output voltage $E_7$. The magnitude of $E_8$ is chosen to be of a value approximately near the specified voltage for output voltage $E_7$ of ±100 volts, for example. Relay 18 is actuated when $E_7$ reaches approximately 50 volts, for example, connecting $E_8$ to the input of summing amplifier 19 and connecting coil 21a with the output thereof through pole 18c. Thus, the relay 21 is actuated by a voltage $E_{10}$ appearing after actuation of relay 18 and voltage $E_7$ reaches the specified voltage when the magnitude of $E_8$ is less than $E_7$ by a voltage difference at $E_9$ sufficient to actuate relay 21. Pole 21d is connected to one input of a sensitive stepper motor 22 and pole 21e is connected to the other input of stepper motor 22. A voltage pulse provided to an input of the stepper motor 22 causes an output shaft rotation of one turn, for example, in one direction, while a pulse provided at the other input would cause the same amount of rotation in the opposite direction. A D.C. power source 23 is connected at the positive terminal to the normally open contacts of poles 21d and 21e. The negative terminal is connected to the stepper motor 22 completing the circuit for the inputs thereto. The stepper motor 22 output $\theta_3$ can be recorded by coupling a mechanical counter 24 to the output shaft thereof.

Figure 7:
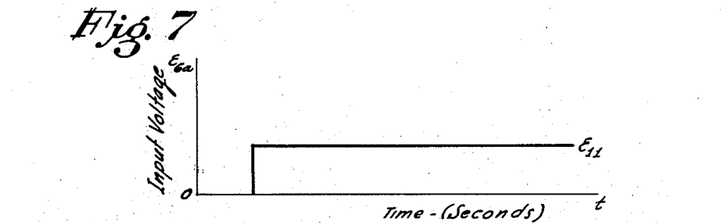
Figures 7, 8, 9 and 10 are graphs which illustrate the operation of the reset integrator version shown in Figure 6.
Figure 8:
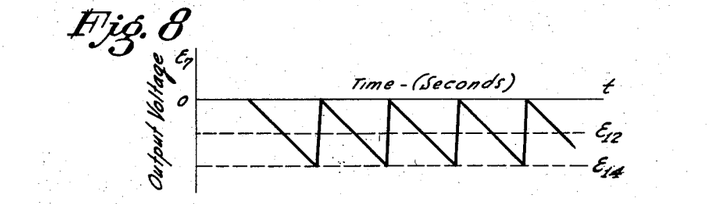
Figure 9:
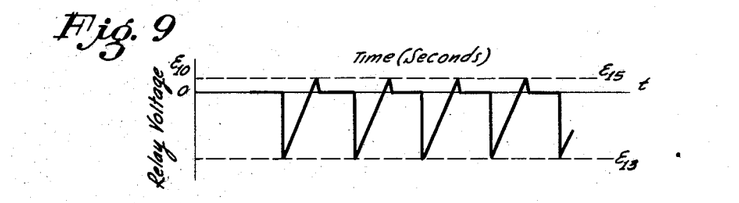

Operation of the reset integrator of Figure 6 is illustrated by the graphs of Figures 7, 8, 9 and 10. In Figure 7, the input voltage $E_{6a}$ can be a positive step function of voltage $E_{11}$, as shown. This input voltage is applied across terminals 15 and 16. The output voltage $E_7$ builds up as a result of the application of $E_{11}$ in a negative direction because of a 180 degree phase reversal of signal which occurs in the integrator. This is clearly shown in Figure 8. When output voltage $E_7$ reaches a magnitude $E_{12}$ (of about 50 volts), the relay 18 is actuated providing a comparison voltage $E_8$ at the input of summing amplifier 19. Output voltage $E_7$ is also applied to the input of the summing amplifier but is of a polarity opposite to that of comparison voltage $E_8$. Consequently, the output voltage $E_9$ of the summing amplifier is the algebraic sum of voltages $E_7$ and $E_8$. The relay 21 is controlled by voltage $E_{10}$ which does not appear until after actuation of relay 18. As shown in Figure 9, $E_{10}$ experiences a sudden drop as soon as relay 18 is actuated at voltage level $E_{12}$. Voltage $E_{10}$ drops to a level $E_{13}$ which is equal to the difference of voltages between $E_7$ and $E_8$. As $E_7$ increases in magnitude, voltage $E_9$ correspondingly rises. There is, of course, a 180 degree phase difference between the input and output voltage for the summing amplifier. Since relay 18 is actuated, voltage $E_{10}$ is the same as $E_9$. When $E_7$ reaches voltage level $E_{14}$ (which is the specified voltage), voltage $E_{10}$ has risen to a voltage $E_{15}$ sufficient to actuate relay 21 in one direction. For example, poles 21b and 21d are actuated to make contact with their respective fixed contacts. Poles 21c and 21e are not disturbed for a position $E_{10}$, for example, but are actuated if $E_{10}$ is negative in exciting coil 21a while poles 21b and 21d would not then be actuated from their normal (open) positions.

Figure 10:
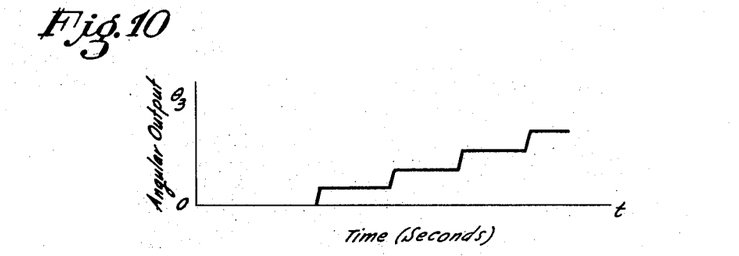

Since pole 18d is actuated to the upper contact position at this time, the closing of pole 21b to its contact shorts out capacitance $C_3$. The rise (Figure 8) is steep because the limiting resistance of the discharge circuit is only that of the wiring and contact points, which is of the order of .1 ohm, maximum. Closing of pole 21d to its fixed contact at the same time connects power from source 23 to actuate the sensitive stepper motor 22 in one direction. $\theta_3$ is a jump function increasing step by step as shown in Figure 10, for each cycle of operation. It is to be noted that a stepper motor having other than a light load on the output shaft thereof would require a wider (stronger) exciting pulse; the switching of pole 21d (or 21e) can be used to trigger such a pulse source in this instance. It is entirely feasible, obviously, to replace stepper motor 22 (and mechanical counter 24) directly with an electronic counter, in which case the integrator becomes fully electronic having a digital output for an analogue input.

Figures 11, 12:
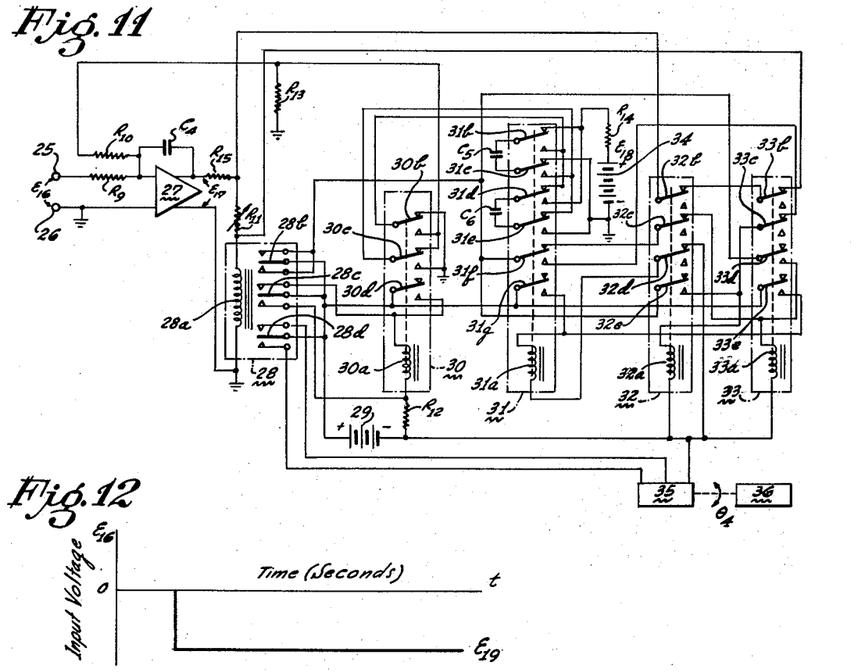
Figure 11 is a schematic diagram of still another version of the reset integrator.
Figures 12, 13 and 14 are graphs which illustrate the operation of the reset integrator version of Figure 11.

In Figure 11, there is shown a preferred embodiment of another version of the reset integrator. A voltage $E_{16}$, proportional to the rate of change of a variable, can be applied across input terminals 25 and 26. These terminals are connected to the input of a conventional D.C. amplifier 27 through series resistance $R_9$. Terminal 26 can also be connected to ground as shown. A high quality capacitance $C_4$ connecting the input and output of D.C. amplifier 27 is the integrating (storage) element of an integrating operational amplifier formed thereby. Resistance $R_{10}$ connected to the input of D.C. amplifier 27 provides another input to the operational amplifier or summing integrator. A series combination of resistance $R_{15}$, adjustable resistance $R_{11}$ and coil 28a of a balanced, polarized relay 28 is connected across the output of the summing integrator. An output voltage $E_{17}$ is developed which is proportional to the integral of the input signal applied to the summing integrator. Output voltage $E_{17}$ has a 180 degree phase difference with respect to the input voltage into the summing integrator.

Polarized relay 28 has three poles 28b, 28c and 28d each associated with a pair of contacts. These three poles are all connected to the positive terminal of a 28 volt D.C. power supply 29. There are also four ordinary relays 30, 31, 32 and 33. Relay 30 is a triple pole, double throw relay having a resistance $R_{12}$ connected in series with energizing coil 30a, the coil 30a controlling poles 30b, 30c and 30d. Relay 31 is a six pole, double throw relay having an energizing coil 31a controlling poles 31b, 31c, 31d, 31e, 31f and 31g. A capacitance $C_5$ is connected between pole 31b and 31c, and capacitance $C_6$ connects pole 31d to pole 31e. A resistance $R_{13}$ is connected to the lower contact of pole 30b and the upper contact of pole 30c of relay 30. A stable voltage source 34 providing a voltage $E_{18}$ of 100 volts D.C., for example, is connected in series with resistance $R_{14}$ which is, in turn, connected to contacts of relay 31, as shown in Figure 11. Relay 32 has an energizing coil 32a controlling four double throw poles 32b, 32c, 32d and 32e. Relay 33 is also a four pole, double throw relay having an energizing coil 33a controlling poles 33b, 33c, 33d and 33e. These relays and elements are connected together as shown in Figure 11 to control a stepper motor 35 yielding a mechanical output. The output here is angular rotation $\theta_4$ of the output shaft of stepper motor 35. This output $\theta_4$ is proportional to the integral of the input signal applied to the reset integrator. The amount of angular rotation can be recorded by a mechanical counter 36 coupled to the output shaft of stepper motor 35.

Figure 13:
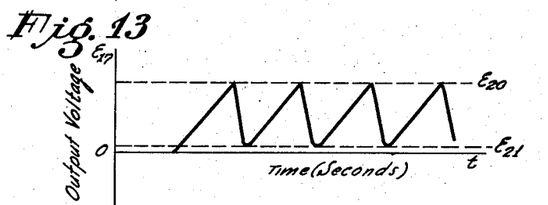

The operation of the reset integrator shown in Figure 11 is illustrated by the graphs of Figures 12, 13 and 14. In Figure 12, a negative step function input of voltage $E_{16}$ (of magnitude $E_{19}$) is, for example, the input signal applied across terminals 25 and 26 (Figure 11). When this is done, the output voltage $E_{17}$ rises as shown in Figure 13. At a voltage $E_{20}$, the polarized relay 28 is actuated such that the poles are deflected to the up position, for the schematic as shown in Figure 11. In this position, pole 28b connects 28 volts D.C. across coil 33a via poles 31f and 32c in their normal positions (as shown). Relay 33 is thus energized and the poles are actuated to make contact with the lower contacts. The switching of pole 33b opens the short circuit across resistance $R_{11}$ and in so doing inserts $R_{11}$ into the output circuit in series with coil 28a, reducing the voltage existing across the coil. Actuation of pole 33c breaks the circuit to coil 32a to keep relay 32 de-energized. Pole 33d, when actuated, provides a holding voltage to coil 33a so long as pole 28b is deflected. Pole 33e provides power to coil 31a because of the return connection through pole 32d to the negative terminal of D.C. source 29 thus actuating relay 31.

The capacitance $C_5$ is fully charged before the switching action of poles 31b and 31c connects pole 31b to pole 30b and pole 31c to pole 30c (to ground). Relay 30 was energized when relay 28 was actuated, pole 28c being deflected upwardly to excite coil 30a. Actuation of pole 30d provides a holding connection which energizes relay 30 after pole 28c is back at its center off position. Thus, capacitance $C_5$ is connected in series with the resistance $R_{13}$, discharging in a circuit having a time constant of $R_{13} C_5$. The voltage developed across resistance $R_{13}$ is a positive transient which is fed back into the input of the integrator through input resistance $R_{10}$ driving the output voltage $E_{17}$ down (Figure 13) until $E_{17}$ reaches a release voltage $E_{21}$ when polarized relay 28 is de-energized. When poles 31b and 31c were actuated, poles 31d and 31e were also actuated to connect capacitance $C_6$ in series with resistance $R_{14}$, voltage source 34 thereby charging up capacitance $C_6$. Actuation of pole 31f would energize relay 32 except that the circuit is open at pole 33c at this time. Pole 31g is a holding connection which maintains relay 31 in an excited condition after relay 28 is de-energized if relay 32 is not energized.

Figure 14:
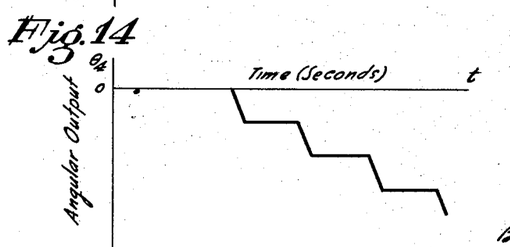

At the same time that relay 28 was energized, stepper motor 35 was excited through pole 28d which was deflected to the up position, to rotate the output shaft a given amount (step) in one direction. This is illustrated in Figure 14. Counter 35 records the total number of revolutions of output.

On the next (second) cycle, the poles of relay 28 are deflected upwardly again when output voltage $E_{17}$ reaches the level $E_{20}$ (Figure 13). This time relay 32 is energized since power is directed through pole 31f (energized position) and pole 33c (normal position). The resistance $R_{11}$ is inserted again in series with coil 28a by action of pole 32b opening from a closed circuit position and actuation of pole 32c prevents relay 33 from becoming energized while actuation of pole 32d breaks the closed circuit of relay coil 31a de-energizing relay 31 which was held on through pole 31g. Pole 32e in actuated position locks relay 32 on as long as pole 28b is actuated. When relay 31 is de-energized, the poles assume their normal position and capacitance $C_5$ is now connected across the series combination of charging resistance $R_{14}$ and source 34 to re-charge this capacitance. Fully charged capacitance $C_6$, however, is connected to poles 30b and 30c which are held in an actuated position through action of locking pole 30d (energizing coil 30a). Pole 31d is connected to pole 30b in an actuated position and a positive transient voltage is again developed across resistance $R_{13}$ which is fed back to the integrator input by input resistance $R_{10}$ to drive output voltage $E_{17}$ down once again. The following cycle repeats the circuit behavior previously described above with each capacitance $C_5$ and $C_6$ being alternately discharged.

On the second cycle, actuation of pole 28c upwardly did not affect circuit behavior this time because relay 30 was kept energized by actuated pole 30d. Actuation of pole 28d, however, energized stepper motor 35 again for a step interval and the angular output $\theta_4$ rotates another increment or step in the same direction which is again recorded by counter 36.

For a positive step function input of voltage at terminals 25 and 26 the circuit behavior is such that a negative transient of voltage is developed across the resistance $R_{13}$ to drive the output down. In this instance, output voltage $E_{17}$ increases negatively when a positive step function input is applied. When the voltage $E_{17}$ reaches a magnitude of $-E_{20}$, relay 28 is actuated such that the poles are deflected to the down position for the illustration of Figure 11. The circuit behavior is similar to the description for the first cycle except that relay 30 is not energized, so that poles 30b and 30c remain in their normal position and the capacitance $C_5$ is connected to discharge negatively through the resistance $R_{13}$. For a circuit condition following the first cycle as first described when relay 30 was locked in an energized condition, the action of pole 28c downwardly is to provide 28 volts D.C. across resistance $R_{12}$ only, countering the 28 volts applied at the other end of coil 30a by pole 30d. Thus, relay 30 is again de-energized and the capacitance $C_6$ is also connected to discharge negatively through resistance $R_{13}$ providing a negative transient to counteract the positive step function input of voltage. Since pole 28d is deflected down, stepper motor 35 is energized to rotate in an opposite direction than before and a positive angular output $\theta_4$ is obtained in a series of steps for a positive step function input.

The polarized relay 28 is not actuated at exactly the same voltage level each cycle. Thus $E_{20}$ (Figure 13) is only a nominal level, the relay 28 being responsive sometimes a few volts above this level and sometimes a few volts below. For a varying input signal (as well as the step function), the output steps would then intersect the true output curve at the step rises, giving a resultant $\theta_4$ output which more nearly approximates the true function, this function (integral) being a smooth curve through the steps which would be the actual average signal measured at the output of the reset integrator.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. An electromechanical integrator, comprising: an integrating operational amplifier having an input and an output, said input adapted to receive an electrical signal and said output providing an electrical signal proportional to the integral of said input signal; amplitude discriminator means connected to said output operably responsive to the output level of said operational amplifier between only a high predetermined level where said output level is high enough to energize said discriminator means from a de-energized condition and a low predetermined level where said output level is too low to maintain said discriminator means energized; means for driving the output signal level of said operational amplifier down when connected to said amplifier, said discriminator means including switching means operatively connecting said driving means to said amplifier throughout the period between said high and low output levels only, and means for producing a mechanical output, said output means connected to said discriminator means to be actuated whenever the latter is energized, whereby said mechanical output is changed in steps and the net output thereof is proportional to the integral of said input signal.

2. Apparatus in accordance with claim 1 wherein said amplitude discriminator means include relay coil means connected across the output of said integrating amplifier and having a magnetic driving relation with said switching means to pull in said switching means at said predetermined high output level and release said switching means at said predetermined low output level, for controlling said driving means and said mechanical output means.

3. An electromechanical integrator, comprising: an electronic summing integrator of the type including a storage capacitance and providing an electrical output signal proportional to the integral of a varying D.C. signal received thereby, a first input circuit and a second input circuit connected to said integrator, said first input circuit adapted to receive an electrical signal proportional to an input function; amplitude discriminator means connected across the output of said integrator operably responsive to the output level of said summing integrator between only a high predetermined level where said output level is high enough to energize said discriminator means from a de-energized condition and a low predetermined level where said output level is too low to maintain said discriminator means energized; a source of constant voltage having a polarity opposite from that of the signal applied to said first input circuit, switching means operatively connected between said voltage source and said second input circuit, said switching means having a driven relationship with said discriminator means to be closed while said discriminator means is energized and open while said discriminator means is de-energized, whereby the output signal from said integrator is periodically driven down to a reset condition in the presence of an input function signal applied to said first input circuit, and means for producing a mechanical output, said output means connected to said discriminator means to be actuated whenever the latter is energized, whereby said mechanical output is changed in steps and the net output thereof is proportional to the integral of said input function.

4. Apparatus in accordance with claim 3 wherein said amplitude discriminator means include a balanced polarized relay with double throw, center-off output contacts forming said switching means, the coil of said relay connected across said integrator output, said output contacts connected in polarity-reversing fashion between said constant voltage source and said second input circuit, said polarized relay being actuated in one direction when said output signal of one polarity reaches an energizing level to connect said voltage from said source to said second input in opposing polarity from that of said input signal said polarized relay actuated in the other direction when said output signal of the opposite polarity reaches an energizing level to connect said voltage from said source again in opposing polarity from that of said input signal, and said polarized relay being returned to its center off position when said output signal is driven down due to said voltage source to a de-energizing value, to thereby disconnect said voltage source.

5. Apparatus in accordance with claim 3 wherein said output means include a source of power and an electrical motor, said power source connected to energize said motor whenever said discriminator means is energized whereby a mechanical output in angular rotation is derived from the output shaft of said motor.

6. Apparatus in accordance with claim 3 wherein said output means include a source of A.C. power; a synchronous motor energized by said A.C. power source; a first and a second magnetic clutch each having an input and an output; a source of D.C. power, said discriminator means connecting said D.C. source to energize said clutches, said first clutch input engaging said first clutch output when said output signal of one polarity operates said discriminator means and said second clutch input engaging said second clutch output when said output signal of another polarity operates said discriminator means; gearing means connecting said motor to drive said clutch inputs in opposite directions; a mechanical differential having two inputs and an output, said differential inputs each connected to a clutch output, whereby a mechanical output in angular rotation is secured at said differential output.

7. An electromechanical integrator, comprising: an integrating operational amplifier having an input and an output, said integrating amplifier having a capacitance storage element, said input adapted to receive an electrical signal proportional to an input function and said output providing an electrical signal proportional to the integral of said input function; amplitude discriminator means connected to said output operably responsive to the output level of said integrating amplifier; switching means connected across said capacitance element for shorting said capacitance element, said switching means operatively connected to said discriminator means to be closed by said discriminator means when said output signal of said integrating amplifier reaches an energizing level, and to be opened by said discriminator means when said output signal drops to a de-energizing level; and means for producing a mechanical output, said output means actuated whenever said discriminator means is energized, whereby said mechanical output is changed in steps and the net output thereof is proportional to the integral of said input function.

8. An electromechanical integrator, comprising: an integrating operational amplifier having an input and output, said integrating amplifier having a capacitance storage element, said input adapted to receive an electrical signal proportional to an input function and said output providing an electrical signal proportional to the integral of said input function; a balanced polarized relay connected to said output of said integrating amplifier; a stable voltage source providing a positive and a negative voltage; a summing operational amplifier having a first and a second input and an output, said first input connected to said output of said integrating amplifier and said second input connected to the pole of double throw switch means operable in one direction by positive energizing voltage to said balanced polarized relay and operable in the other direction by negative energizing voltage, opposite throw positions of said double throw switch means connected respectively to the positive and negative terminals of said stable voltage source in proper polarity to apply to said second input a voltage from said source opposite in polarity from that of said integrating amplifier output when said output signal reaches an energizing level to operate said balanced polarized relay, said voltage disconnected from said second input when said output signal drops to a de-energizing level; a second polarized relay connected to the output of said summing amplifier operably responsive to the output signal of said summing amplifier, said second polarized relay operated when said balanced polarized relay is energized and the output of said summing amplifier reaches an energizing level to operate said second polarized relay; shorting means connected by said polarized relays when operated to short said capacitance element driving said output of said integrating amplifier down to the de-energizing level; and means for producing a mechanical output, said output means electrically actuated by control switching means drivenly connected to said second polarized relay whenever said second polarized relay is energized, whereby said mechanical output is changed in steps and the net output thereof is proportional to the integral of said input function.

9. Apparatus in accordance with claim 8 wherein said output means include a source of power and a sensitive stepper motor, said power source connected to energize said motor whenever said second polarized relay is energized, whereby a mechanical output in angular step rotation is derived from the output shaft of said motor.

10. Apparatus in accordance with claim 8 including, in addition, means connected to said output means for measuring and recording the net mechanical output thereof.

11. An electromechanical integrator comprising: an electronic summing integrator of the type including a storage capacitance and providing an electrical output signal proportional to the integral of a varying D.C. signal receiving thereby; a first input circuit and a second input circuit connected to said electronic integrator, said first input circuit adapted to receive an electrical signal proportional to an input function; amplitude and polarity discriminating means connected across the output of said electronic integrator and operably responsive to the output signal level of said electronic integrator between only a predetermined high output level where said level is high enough to energize said discriminator means from a de-energized condition, in either one of two opposite directions depending upon the polarity of the output signal, and a predetermined low output level where said level is too low to maintain said discriminator means energized in either direction; a source of constant voltage having an absolute value at least equal to the maximum magnitude of the input signal to said first input circuit; a first and a second discharge capacitance; a resistance connected across said second input circuit; two-position switching means connected to said discharging capacitances, one position of said switching means connecting said first discharge capacitance across said voltage source, and said second discharge capacitance across said resistance, and the other position of said switching means connecting said second discharge capacitance across said voltage source, and said first discharge capacitance across said resistance; switching control means operatively connected between said discriminator means and said two-position switching means to drive said switching means from one position to the other for each full on-off cycle of said discriminator means in either direction; reversible polarity control means connected between said switching means and said resistance, said polarity control means being connected to and positioned by said discriminator means to apply said discharge capacitances across said resistance in proper polarity to drive down the output signal to a reset condition each time said discriminator means is energized; a source of power; means for producing a reversible mechanical output when connected to said power source; and two-way connecting means respectively operated by said discriminator means only when the latter is energized in a respective direction as recited, whereby said mechanical ouptut is changed forward or backward in steps and the net mechanical output thereof is proportional to the integral of the input function represented by the signal on said first input circuit.

12. Apparatus in accordance with claim 11 wherein said discriminator means include a balanced polarized relay with the control coil thereof connected across the output of said electronic integrator, and wherein said switching control means and said polarity control means comprise a relay network.

13. Apparatus in accordance with claim 11 wherein said mechanical output means include a two-directional electrically operated stepper motor having an output shaft and two electrical control inputs respectively connected through corresponding directional output contacts of said discriminator means to said power source.

14. An electronic analogue to digital function integrator, comprising: an integrating operational amplifier having an input and an output, said input adapted to re-receive a varying D.C. electrical signal proportional to an input function and said output providing an electrical signal proportional to the integral of said input function; amplitude discriminator means connected to said output operably responsive to the output level of said operational amplifier between only a high predetermined level where said output level is high enough to energize said discriminator means from a de-energized condition and a low predetermined level where said output level is too low to maintain said discriminator means energized; means for driving the output signal level of said operational amplifier down when connected to said amplifier, said discriminator means including switching means operatively connecting said driving means to said amplifier throughout the period between said high and low output levels only; a voltage source; separate output circuit means, and second switching means operated by said discriminator means for connecting said voltage source to said output circuit means whenever said discriminator means is energized, whereby a pulse output is provided and the net digital output thereof is proportional to the integral of said input function.

References Cited in the file of this patent

UNITED STATES PATENTS

| | | |
|---|---|---|
| 2,239,363 | Gilbert | Apr. 22, 1941 |
| 2,551,964 | Norton | May 8, 1951 |
| 2,622,231 | Gray | Dec. 16, 1952 |
| 2,717,310 | Woodruff | Sept. 6, 1955 |

OTHER REFERENCES

Rev. of Sci. Inst., vol. 22 No. 9, September 1951, "A Combined Current Indicator and Integrator," by Higinbotham et al., pages 688 to 690.

Rev. of Sci. Inst., vol. 23 No. 12 December 1952, "A Direct Current Microampere Integrator," by Schweiger, pages 735 to 738.

Convention Record of IRE, part 7, "An Analog-to-Digital Converter With an Improved Linear-Sweep Generator," by Slaughter, April 1953, pages 7 to 12.